US007085058B2

United States Patent
Heim

(10) Patent No.: US 7,085,058 B2
(45) Date of Patent: Aug. 1, 2006

(54) SECURITY ELEMENT WITH FLIP-FLOP COLOR CHANGE EFFECT AND MAGNETIC PROPERTIES, ARTICLE COMPROMISING SUCH A SECURITY ELEMENT AND METHOD FOR PRODUCING SAID SECURITY ELEMENT AND SAID ARTICLE

(75) Inventor: Manfred Heim, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 10/501,734

(22) PCT Filed: Jan. 17, 2003

(86) PCT No.: PCT/EP03/00447

§ 371 (c)(1),
(2), (4) Date: Apr. 26, 2005

(87) PCT Pub. No.: WO03/059644

PCT Pub. Date: Jul. 24, 2003

(65) Prior Publication Data

US 2005/0174644 A1     Aug. 11, 2005

(30) Foreign Application Priority Data

Jan. 18, 2002    (DE)    ................. 102 02 035

(51) Int. Cl.
*G02B 1/10* (2006.01)
(52) U.S. Cl. ............... 359/582; 359/577; 359/584; 359/587; 359/2; 359/580

(58) Field of Classification Search ........... 359/577, 359/2
See application file for complete search history.

(56) References Cited

U.S. PATENT DOCUMENTS

| 4,705,300 A | 11/1987 | Berning et al. |
| 2005/0123755 A1 * | 6/2005 | Argoitia et al. ............ 428/402 |

FOREIGN PATENT DOCUMENTS

| EP | 0 341 002 A | 11/1989 |
| EP | 0 756 945 A | 2/1997 |
| WO | WO01 03945 A | 1/2001 |

* cited by examiner

Primary Examiner—Fayez G. Assaf
(74) Attorney, Agent, or Firm—Rothwell, Figg, Ernst & Manbeck

(57) ABSTRACT

A security element (1) for application or embedding in objects (300), in particular for documents of value such as bank notes, credit cards and the like, is structured in a multi-layer fashion and has an interference element I, which produces a color shift effect, a layer M with magnetic properties and a reflection layer R, which is located between interference element I and magnetic layer M. Designs of the invention pro-vide a negative writing 20 and/or coding 11 in reflection layer R and magnetic layer M. According to a further design diffraction structures 2 are integrated in the security element 1. Such a security element in particular is suitable as window security thread 200 in bank notes.

29 Claims, 3 Drawing Sheets

SECURITY ELEMENT WITH FLIP-FLOP COLOR CHANGE EFFECT AND MAGNETIC PROPERTIES, ARTICLE COMPROMISING SUCH A SECURITY ELEMENT AND METHOD FOR PRODUCING SAID SECURITY ELEMENT AND SAID ARTICLE

CROSS-REFERENCE TO RELATED APPLICATION

This application is a National Phase of International Application Ser. No. PCT/EP03/00447, filed Jan. 17, 2003.

FIELD OF THE INVENTION

This invention relates to a security element for objects in general and for documents of value in particular, as for example bank notes, credit cards and the like. Furthermore, the invention relates to objects equipped with such a security element as well as to methods for producing such security elements and objects. Such objects can also be semifinished products for further processing, for example unprinted bank note paper.

DESCRIPTION OF THE BACKGROUND ART

In order to prove the authenticity of objects and to be able to differentiate objects from forgeries, these are provided with complex, forgery-proof, visually and/or automatically testable security elements. Objects particularly worthy of protection are documents of value, in particular bank notes, checks, check cards, credit cards, identity cards, passports, admission tickets, tickets for public transport and the like.

The more complex the security elements and the more elaborate the production of them, the higher the forgery protection. One security element often combines several different security features which are partly hidden and therefore only machine-readable or discernible with the help of additional apparatus and which are partly visible to the naked eye so as to enable a visual test. The combination of several security features in one security element is not always easily to realize and from time to time involves compromises, which cause particular security features to no longer be able to develop their optimal effect.

For example, from WO 01/03945 A1 a multilayer security element for security documents, bank notes and credit cards is known, which combines a layer with embossed diffraction structures with a color shift layer. Here color shift effect means the effect of color change from different viewing angles. Each of both security features offers effective copy protection and has optical effects easily to visually test. Additionally, both security features can only be imitated with great efforts. The optical effect of embossed holograms is substantially enhanced when the diffraction structures are viewed in front of a reflecting background, and the color shift effects, too, are brought out especially intensively in front of a specularly reflective background. Therefore, in WO 01/03945 A1 is, among other things, proposed to combine the layer provided with diffraction structures and the color shift effect layer with a common reflective metal background layer. This reflective metal background layer can additionally have magnetic properties so that a further third magnetic security feature is integrated in the security element.

The problem with a reflective background coating with magnetic properties is the fact that magnetic materials as a rule have poor reflection properties. Those with acceptable reflection properties, however, have less distinct magnetic properties. In EP 0 341 002 B1 a thin-layer structure with a color shift effect layer and a magnetic metal background coating of a cobalt nickel alloy is proposed as security element. Such a background coating should have acceptable reflection properties as well as good magnetic properties. Nonetheless, the reflection properties are not optimally.

SUMMARY OF THE INVENTION

It is therefore the problem of the present invention to propose an improved multilayer security element with optimized, i.e. intensive color shift effect and with at the same time optimized magnetic properties, an object provided with such a security element and methods for producing the security element and the object.

According to this the multilayer security element has an interferential layer structure, which produces a color shift effect when the security element is viewed from different angles, and a layer with magnetic properties. The interferential layer structure here is composed of a multilayer interference element I and a reflection layer R. The interference element, the reflection layer and the layer with magnetic properties here are disposed in such a way, that the reflection layer is located between the interference element and the layer with the magnetic properties. The reflection layer usually is a reflecting metal layer.

The interference element is formed by absorber and dielectric layers located one on top of the other, wherein also several absorber and dielectric layers can be disposed in turns on top of each other. Instead of alternating absorber and dielectric layers, exclusively dielectric layers can be provided, too, adjoining layers having strongly different indices of refraction so as to produce a color shift effect. The use of absorber layers, however, is advantageous, because the color shift effect is visible better.

Optical interference coatings with color shift effect are widely known and in connection with security elements described in, for example, EP 0 395 410 B1, EP 0 341 002 B1, WO 01/03945 A1 and U.S. Pat. No. 3,858,977. Their special property is that they render different color impressions from different viewing angles. According to kind and number of layers in the layer structure, two, three, four or more color effects depending on the viewing angle can occur. Reflection and transmission properties of such color shift effect layers depend on several factors, in particular on indices of refraction, absorption coefficients and layer thicknesses as well as on the number of layers in the layer structure.

According to the invention, the individual layers of the optical interference element as well as the reflective metal layer and the layer with magnetic properties are applied, preferably vapor-deposited, to a substrate, the layers overlapping each other at least partially. Here it is essential that the reflecting metal layer is disposed between the layer with magnetic properties and the interference element, so as to the reflection layer can take its positive optical effect as background for the interference element.

The multilayer security element can be put on an object with or without the substrate, for example by the hot stamping method. In case of a transfer without the substrate the multilayer security element is produced on one side of the substrate, the layer order here can be either substrate/interference element/reflection layer/magnetic layer or substrate/magnetic layer/reflection layer/interference element. In case the security element is applied together with the substrate to an object or integrated in an object, for example as a label on or as a window thread in a bank note, then the magnetic layer can also be present on the back of the substrate.

The security element structured according to the invention can be combined with further security features, in particular with a negative or positive writing by local removal of reflection layer and magnetic layer. The writing preferably represents alphanumeric characters but is not restricted to that. Within the terms of the invention this can be every symbol, pattern or coding that can be represented. Alternatively or additionally, diffraction structures can be present on or in the substrate the layers are produced on, or on or in a separate layer, for example an embossed lacquer layer.

By local removal of the magnetic layer and the reflection layer the security element becomes, dependent on the design of the individual layers, partially transparent or semitransparent, since the interference element is transparent or semitransparent. "Semitransparency" here means translucence, i.e. a translucent security element shows a light transmission ratio of under 90%, preferably between 80% and 20%. When using such a partially semitransparent security element, for example as a security thread in a bank note, an incident light/transmitted light effect is the result. That means the symbols, patterns and codings of the security thread embedded in the bank note are not perceptible in incident light, but when viewed in transmitted light they become clearly apparent as brighter areas vis-à-vis a darker surrounding.

The inventive security element is especially suitable for the combination with diffraction structures for producing further color effects. The diffraction structures are, for example, grating structures, refraction patterns, reflection, transmission, or volume holograms. Diffraction structures can be present, for example directly as embossings in the substrate bearing the layers, for example in the carrier material of a plastic thread, or else be placed in an additional layer. The additional layer can be, for example, a lacquer layer. The color effects obtained therewith are based on a diffraction of the light in the embossed relief structures. Such diffraction structures develop the most intensive optical effect in front of a reflecting metallic background. The inventive security element already has a reflecting metallic layer, which therefore can easily serve as a reflecting metallic background for the diffraction structure.

The metallic reflection layer can consist of, for example, aluminum, silver, nickel, platinum or palladium, preferably of aluminum or silver. Both materials are electrically conductive, so that the electrical conductivity of the security element can be taken into consideration as an additional security feature.

BRIEF DESCRIPTION OF THE DRAWINGS

In the following, by way of example only, the invention is described with reference to the accompanying figures. The proportions shown in the figures do not necessarily correspond to the dimensions present in reality and primarily serve for the improvement of clarity.

DETAILED DESCRIPTION OF THE INVENTION

The technical explanations for the individual figures are not restricted to the embodiment shown in the respective figures, but also serve as explanations for the general inventive idea.

Figure 1:
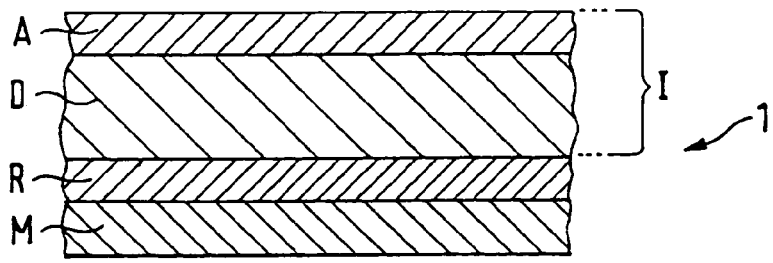
FIG. 1 schematically shows the layer order of an inventive security element.

FIG. 1 partially shows the cross-section of the layer structure of a security element 1 according to a basic embodiment of the present invention. The layer structure with color shift effect comprises a multilayer interference element I, a layer M with magnetic properties and a reflection layer R located between the interference element I and the layer M with magnetic properties. Such a security element 1 is put on an object or integrated in an object in such a way, that the interference element I is visually perceptible, i.e. it is facing the observer.

This applies to all embodiments also to those of FIG. 2 to 7. Any transparent or semitransparent layers may well be additionally provided on top of the interference element I or as intermediate layers.

The interference element I also has a multilayer structure and comprises of at least two layers, namely in the embodiment according to FIG. 1 an absorber layer A and a dielectric layer D therebelow. The physical effects, in principle known by experts, of the individual layers within the interference layer structure, consisting of reflection layers and interference elements, when producing the color shift effect are described, for example, in EP 0 395 410 B1. As absorber layer A typically serves a metal layer of materials such as chromium, iron, gold or titanium of a thickness of preferably 4 nm to 20 nm. Compounds such as nickel chromium iron, but also metals such as vanadium, palladium or molybdenum can be used as materials for absorber layers, too. Further suitable materials for the absorber layer are specified, for example, in WO 01/03945 A1, e.g. nickel, cobalt, tungsten, niobium, aluminum, metal compounds such as metallic fluorides, oxides, -sulphides, -nitrides, -carbides, -phosphides, -selenides, -silicides and compounds thereof, but also carbon, germanium, cermet, iron oxide and the like.

For the dielectric layer mainly transparent materials with a low index of refraction n (n<1.7) are considered, such as for example $SiO_2$, $MgF_2$, $SiO_x$ with $1 \leq x \leq 2$ and $Al_2O_3$. In principle, nearly all clear compounds which can be vapor-deposited are acceptable, therefore, in particular also higher refracting coating materials such as $ZrO_2$, $ZnS$, $TiO_2$ and indium tin oxides (ITO). Further suitable dielectric layers are specified, for example, in WO 01/03945 A1.

The layer thickness of the dielectric layer D usually is in a range of 100 nm to 1000 nm, preferably 200 nm to 500 nm.

Instead of absorber layers A also dielectric layers D can be used, wherein the refractive indices of adjoining dielectric layers D have to be greatly different, i.e. on the one hand n<1.7 and on the other hand n>1.7 so as to cause a distinct color shift effect.

The reflection layer R preferably is a metal layer of silver or aluminum or of another strongly reflecting metal. The reflection layer R is of decisive significance for the desired color shift effect. The better the reflection properties in the reflection layer R, the more striking is the color shift effect.

The layer M with magnetic properties is preferably a magnetic metal layer consisting of nickel, iron, cobalt or an alloy consisting of the said metals or an alloy consisting of one of the said metals and other materials, wherein at least one of the said three materials has a weight share of at least 20%. As to the magnetic properties in the magnetic layer M are sufficiently pronounced for an automatic test, the thickness of the magnetic layer M preferably is between 10 nm and 1000 nm. The material of the magnetic layer M can be chosen in such a way that it has the desired magnetic properties. In particular coercive force and remanence properties can be adjusted optimally, since the magnetic layer M has no reflection function for the interference element I at all. The magnetic layer M can also be present, for example, as coding, like a bar code, without impairing the optical properties of the security element. Since the magnetic layer M is located, invisible for the observer, behind the reflection layer R. Thus the optical properties and magnetic properties of the security element are completely decoupled from each other by the presence of the reflection layer R.

All layers A, D, R, M are preferably produced by means of a vacuum vapor deposition method on a substrate which can form a component of the security element 1, but which can also serve only as an intermediate carrier and is removed when the security element is applied to or in an object at the latest. Most different vapor deposition methods are suitable for the production of the layers, one methodic group is formed by physical vapor deposition (PVD) with evaporation boat, vapor deposition by resistance heating and vapor deposition by induction heating. But also electron-beam vapor deposition, sputtering (DC or AC) and electric-arc vapor deposition are possible. Furthermore, the vapor deposition can also be effected by chemical vapor deposition (CVD) or by sputtering in reactive plasma or any other plasma activated vapor deposition method. Apart from vapor deposition methods layers can, if possible, also be printed on. Here the magnetic layer can be placed in the layer structure with the use of suitable printing inks.

Figure 2:
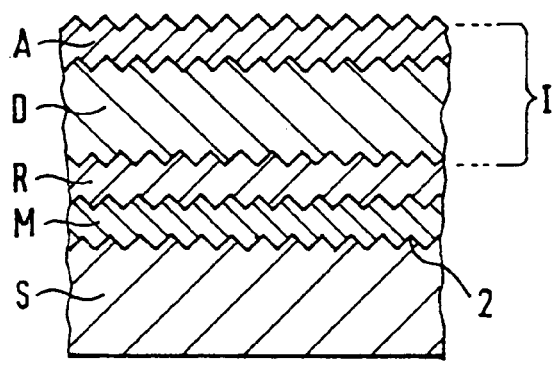
FIGS. 2–6 show the layer structure of an inventive security element in combination with a substrate with embossed diffraction structures which is disposed at different places within the layer structure.
Figure 4:
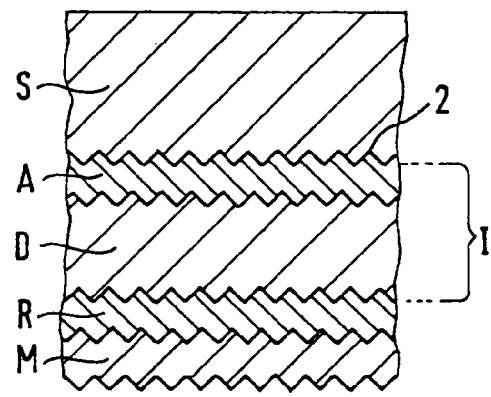
Figure 3:
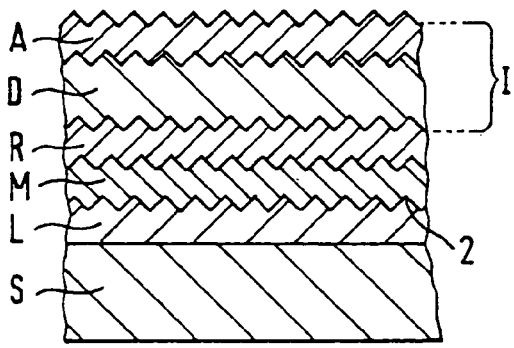
Figure 5:
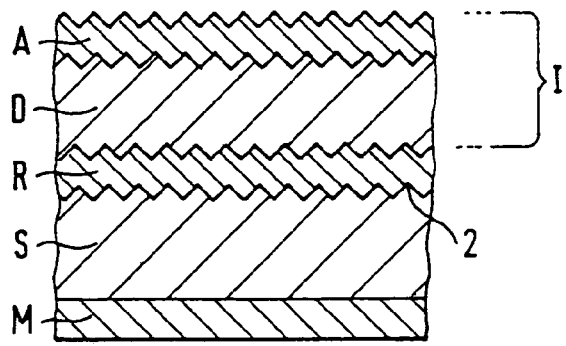

In FIGS. 2 to 6 different possible layer structures of an inventive security element are shown, the substrate S being disposed at different places in the layer order I-R-M. According to that the substrate S can be located below or on top of the layers I, R, M (FIGS. 2, 3, 5). It can, however, also be located between the reflection layer R and the magnetic layer M (FIG. 5). If the substrate is located on top of the interference element I (FIGS. 4, 6), it is important that the substrate S is as much as possible transparent or at least semitransparent, as to not negatively influence the intensity of the color shift effect.

In the security element according to the invention diffraction structures can be integrated particularly well, preferably in the substrate S, but they can also be formed, if desired, by a separate layer. Here the diffraction structures can extend all over the whole security element or are only present in partial areas.

In FIGS. 2, 4, 5 and 6 diffraction structures 2 are embossed in a carrier foil or in the substrate S. The metallic coating for intensifying the visual impression of the diffraction image typically present in this connection, is already embodied in the inventive security element by the reflection layer R and therefore needs not to be provided separately. An optimal visual impression of a reflection hologram is obtained, when the reflection layer R immediately adjoins the diffraction structure 2 as to be seen in FIG. 5. With an embossed diffraction structure the embossing process preferably is effected before the coating of the substrate S. However, in case the magnetic layer M is located between the reflection layer R and the embossed substrate S, as shown in FIG. 2, the optical quality decreases with the increasing thickness of the magnetic layer M. In this case it may be advantageous to emboss the diffraction structures in the metal-coated substrate surface.

Figure 6:
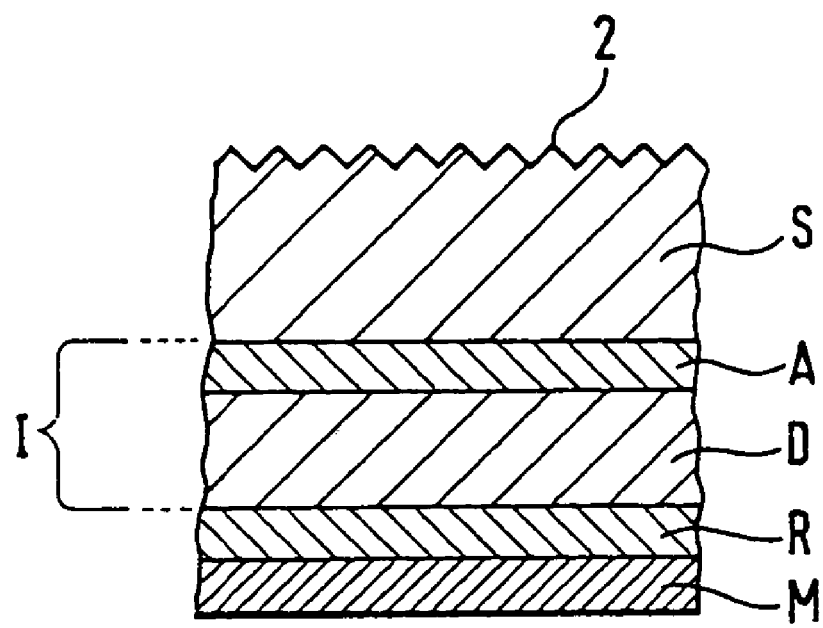

The embossed relief structure can also be at a distance from the reflection layer R, provided that in any case the reflection layer R forms the background to the embossed relief structure 2 for the observer, as to be seen in FIGS. 4 and 6. The optical impression of a reflection diffraction structure with a reflection layer at a distance, however, is less brilliant.

Instead of the diffraction structures being integrated in the substrate, they can also be present in a separate layer. FIG. 3 shows a layer structure comparable to that in FIG. 2, wherein between the substrate and the magnetic layer a separate layer, here a lacquer layer L, is present, in which diffraction structures 2 are embossed. The embossed lacquer layer alternatively could be located between the layers M and R or on top of layer A.

In principle diffraction structures can be placed between all layers or on top of the outer surfaces of the outer layers, as long as the layer unit consisting of interference element I and reflection layer R is not interrupted. The diffraction structures here reproduce themselves in the subsequently applied layers.

The reflecting metal layer R present in the security element, according to a preferred embodiment of the invention is interrupted so as to produce a writing, pattern or code visible in transmitted light, the magnetic layer having to be interrupted in the same area as to not impede the transmitted light effect. For the production of such a security element, transparent or at least semitransparent plastic films are vapor-deposited all over with a magnetic layer M and a reflection layer R. In these layers are placed gaps in the form of the desired characters, patterns and codings with the help of known methods (washing method, etching, spark erosion etc.). Preferably the washing method is used, during which at first the desired pattern is printed on the carrier material with washable ink. Then the vapor deposition of the reflection layer and magnetic layer is effected. By means of washing, the layers above the washable ink are removed, too, so that at this place a gap is produced. A number of methods for producing symbols and patterns are known to experts. In particular, the reflection layer R and the magnetic layer M can be applied separately and etched or washed separately, if, for example, the gaps in the magnetic layer M are to have a size differing from that of the symbols, patterns and codings in the reflection layer R.

Figure 7:
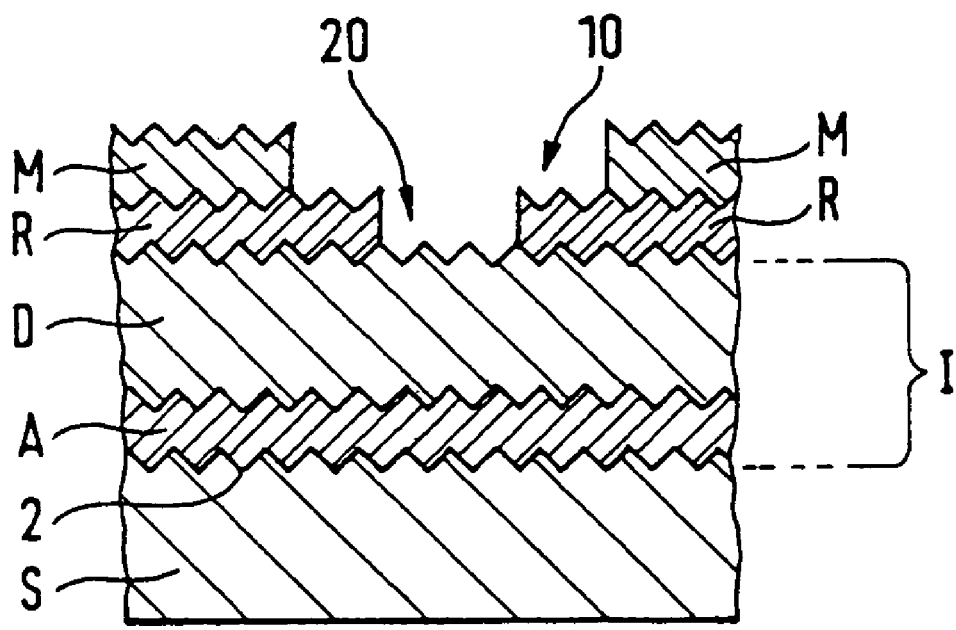
FIG. 7 shows the layer structure of a security element according to FIG. 4 with gaps in the magnetic layer and the reflection layer.
Figure 8:
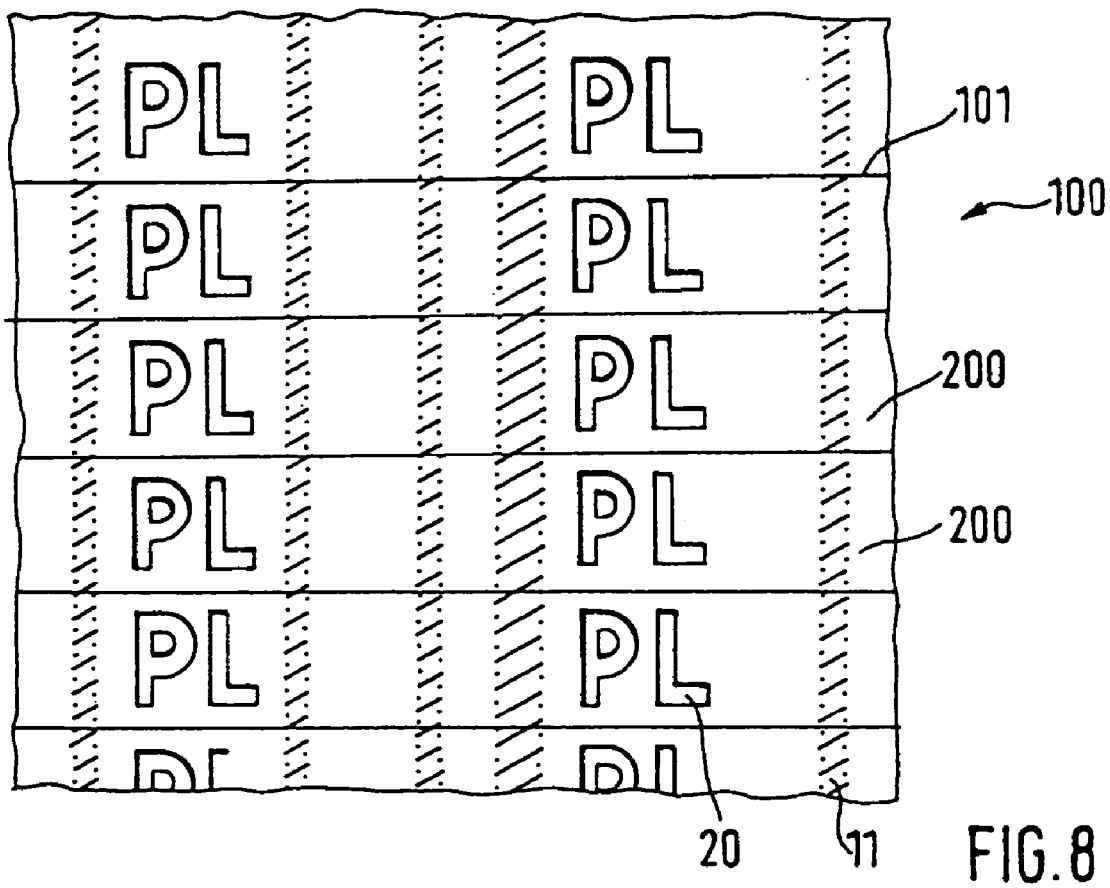
FIG. 8 shows a semifinished product with several connected security elements in top view with a layer structure according to FIG. 7.

By way of example only, this is shown in FIGS. 7 and 8 in a security element with a layer structure according to FIG. 4. On the substrate S in the form of a plastic film with embossed diffraction structure 2 the interference element I is vapor-deposited and adjoining the interference element I at first the reflection layer R and then the magnetic layer M. The reflection layer R has gaps 20 in the form of a repeated writing "PL", as to be seen in FIG. 8. The gaps 10 in the magnetic layer M are substantially larger than the gaps 20 in the reflection layer R and form a magnetic bar code 11, as also to be seen in FIG. 8. The code can be seen, depending on the embodiment, in the positive or negative patterns, i.e. in the magnetic areas or in the gaps.

FIG. 8 shows an intermediate product 100 from top view for producing numerous security elements 1 in the form of security threads 200 with the cross-section shown in FIG. 7. The gaps 20 in the form of the characters "PL"0 are visible through the interference element I and the transparent carrier material or substrate S. The magnetic layer M located behind the reflection layer R, and therefore not visible in plan view, is only present in partial areas 11 which form a bar code and are faintly marked in dot-and-dash pattern in FIG. 8.

The intermediate product 100 shown in FIG. 8, in a subsequent procedure step, is separated along the separating line 101 so as to form security threads 200 for the embedding in e.g. bank notes. The characters "PL" formed by the gaps 20 in the reflection layer R are hardly discernible in incident light in a security thread embedded in a bank note, in transmitted light, however, they are perceptible as negative writing.

Figure 9:
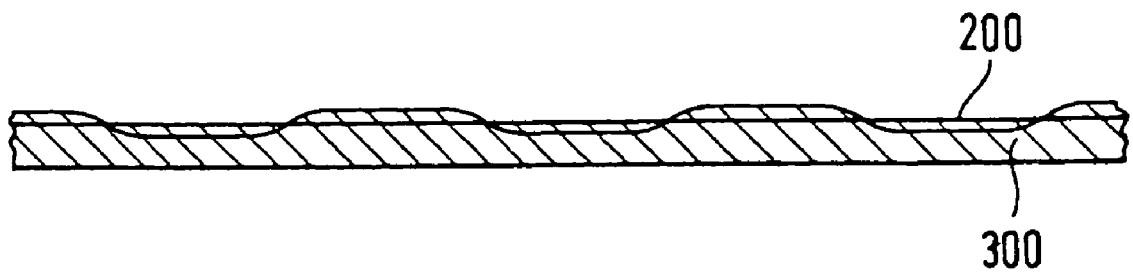
FIG. 9 shows the cross-section of a security thread which is embedded as a window thread in a bank note.

Security threads with a structure as described in FIGS. 7 and 8 are particularly suitable for the use as window security thread, which is embedded in a document in such a way, that it is at least in places directly visible or emerging at the surface. This is shown in FIG. 9 with the cross-section of a bank note 300 as example. Methods for embedding the security thread 200 in paper under the forming of windows in the area of the security thread are described e.g. in DE-A-36 01 114. With a thread embedded in such a way, when viewed in incident light, in the window area mainly the diffraction structure or reflection pattern is visible, however, when viewed in transmitted light the negative writing present in the metal coating dominates. In both cases the color shift effect caused by the interference layer structure remains perceptible.

The inventive security element thus combines in its simplest embodiment three security features in an optimal way with each other, namely on the one hand a color shift effect in combination with an optimal reflecting metal layer, whose electrical conductivity forms a second security feature, and finally a magnetic security feature, whose properties can be optimally adjusted without negatively affecting the other security features.

Further security features can be combined with the inventive security element, for example, by means of a partial removal of the reflection layer as to form patterns or symbols and/or partial removal of the magnetic layer as to form a coding, for example a bar code, as well as by combination with diffraction structures, in particular in the form of an embossed structure, preferably adjoining the already present reflection layer R.

One preferred area of use of the inventive security element has already been stated above as security thread, in particular as machine-readable magnetic-hologram window security thread with color shift effect and negative writing. However, the security element can also be bonded as stripe or plane element to an object, in particular a document of value, preferably a bank note, or in another way with or without the substrate be transferred to an object, for example by hot stamping method.

The invention claimed is:

1. Security element for objects, comprising several layers located on top of each other, namely at least one color shift effect producing interference element and a layer with magnetic properties, characterized in that a reflection layer is disposed between the layer with magnetic properties and the at least one interference element, wherein the layer with magnetic properties and the reflection layer have gaps in a form of symbols or patterns or codings.

2. Security element according to claim 1, wherein the gaps in the layer with magnetic properties are larger than the gaps in the reflection layer and form a machine-readable coding, wherein the layer with magnetic properties and the reflection layer have gaps in a form of symbols or patterns or codings.

3. Security element according to claim 1, comprising diffraction structures.

4. Security element according to claim 3, wherein the diffraction structures are integrated in an additional layer.

5. Security element according to claim 3, wherein the reflection layer adjoins the diffraction structures.

6. Security element according to claim 3, wherein the interference element comprises an absorber layer which adjoins the diffraction structures.

7. Security element according to claim 1, comprising a substrate on which the layers are present.

8. Security element according to claim 7, wherein the substrate is provided with diffraction structures.

9. Security element according to claim 8, wherein the diffraction structures are embossed in a surface of the substrate.

10. Security element according to claim 1, wherein the security element is formed as a security thread.

11. Security element according to claim 1, wherein the security element is formed as a plane element or stripe for application to objects.

12. Security element according to claim 11, wherein the security element is formed as a transfer element.

13. The security element of claim 11 wherein said object is a document of value.

14. Object comprising a security element according to claim 1.

15. Object according to claim 14, wherein the object is a document of value.

16. Object according to claim 15, wherein the security element is a security thread.

17. Object according to claim 16, wherein the security thread (200) in the document of value is embedded as a window thread.

18. Object according to claim 14, wherein the security element is put on the object.

19. Object according to claim 14, wherein the object is a bank note.

20. Method for producing a security element according to claim 1, comprising the steps:
   providing a substrate,
   coating the substrate with at least one interference element, with a layer with magnetic properties and with a reflection layer in such a way, that the reflecting metal layer is located between the layer with magnetic properties and the at least one interference element, wherein by partial removal of the reflecting metal layer and the layer with magnetic properties transparent areas in a form of symbols, patterns or codings are produced.

21. Method according to claim 20, wherein a diffraction structure is placed, in particular embossed, in or on top of the substrate or an additional layer.

22. Method according to claim 20, wherein the layers are produced with a vapor deposition method.

23. Method according to claim 20, wherein the layers are applied to one side of the substrate.

24. Method according to claim 20, wherein from the layer with magnetic proper-ties are removed larger parts than from the metal layer, so that the layer with magnetic properties forms a machine-readable coding which is different from the semitransparent areas.

25. Method for producing an object with a security element according to claim 1, wherein the security element is produced by providing a substrate, and
   coating the substrate with at least one interference element, with a layer with magnetic properties and with a reflection layer in such a way, that the reflecting metal layer is located between the layer with magnetic properties and the at least one interference element, and the security element thereby produced is put on an object, wherein by partial removal of the reflecting metal layer and the layer with magnetic properties transparent areas in a form of symbols, patterns or codings are produced.

26. Method for producing an object with a security element according to claim 1, wherein the security element is produced by providing a substrate, and coating the substrate with at least one interference element, with a layer with magnetic properties and with a reflection layer in such a way, that the reflecting metal layer is located between the layer with magnetic properties and the at least one interference element, and wherein the security element thereby produced is embedded in paper, wherein by partial removal of the reflecting metal layer and the layer with magnetic properties transparent areas in a form of symbols, patterns or codings are produced.

27. Method according to claim 26, wherein the security element is embedded in the paper in the fashion of a window thread.

28. The security element of claim 1, comprising a document of value.

29. The security element of claim 28, wherein said document of value comprises a bank note or credit card.

* * * * *